No. 734,115. PATENTED JULY 21, 1903.
H. O. BENEDICT.
VEHICLE BRAKE.
APPLICATION FILED MAR. 7, 1903.
NO MODEL. 2 SHEETS—SHEET 1.
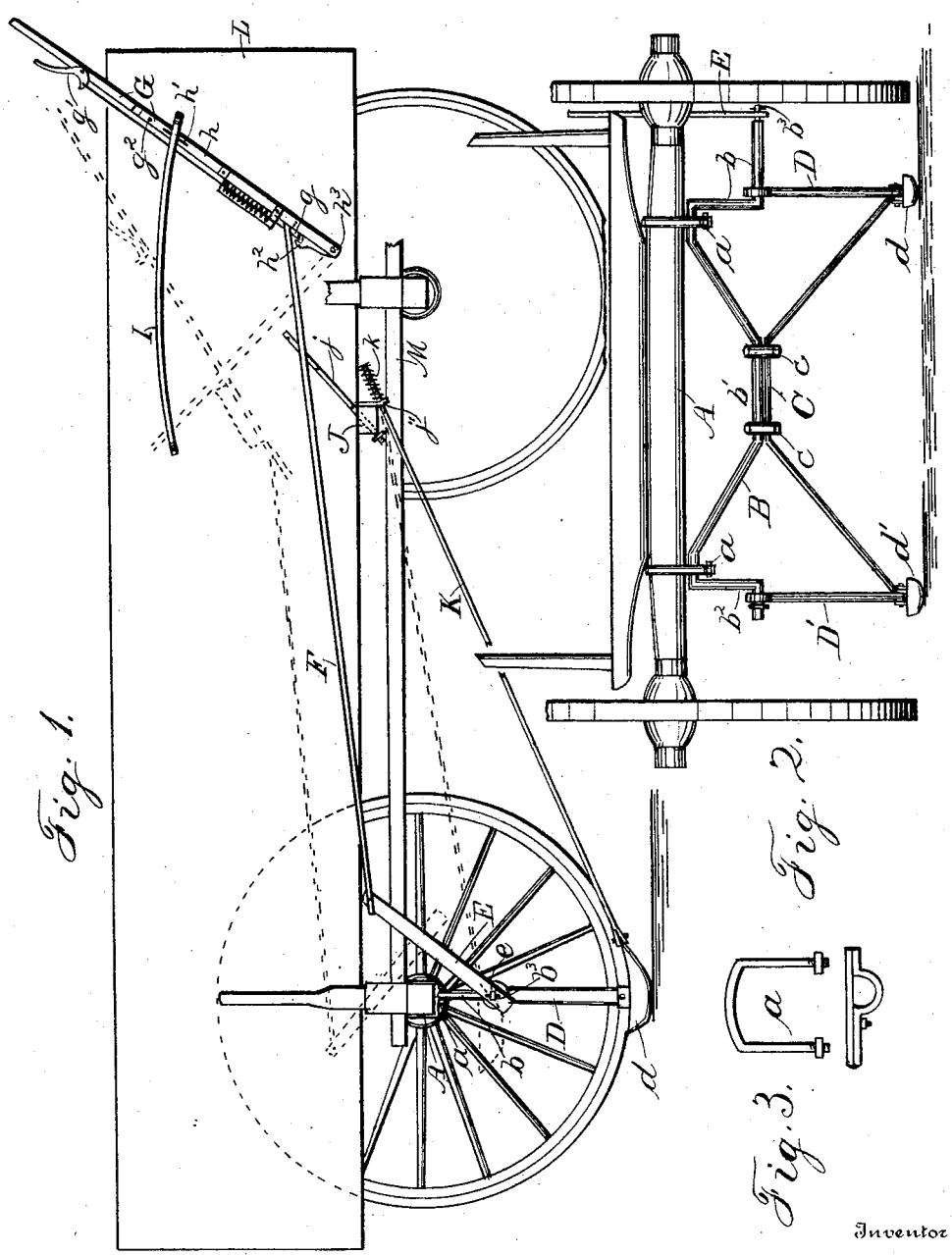
Witnesses
Inventor
Harvey O. Benedict
By Chas. D. Swett
Attorney

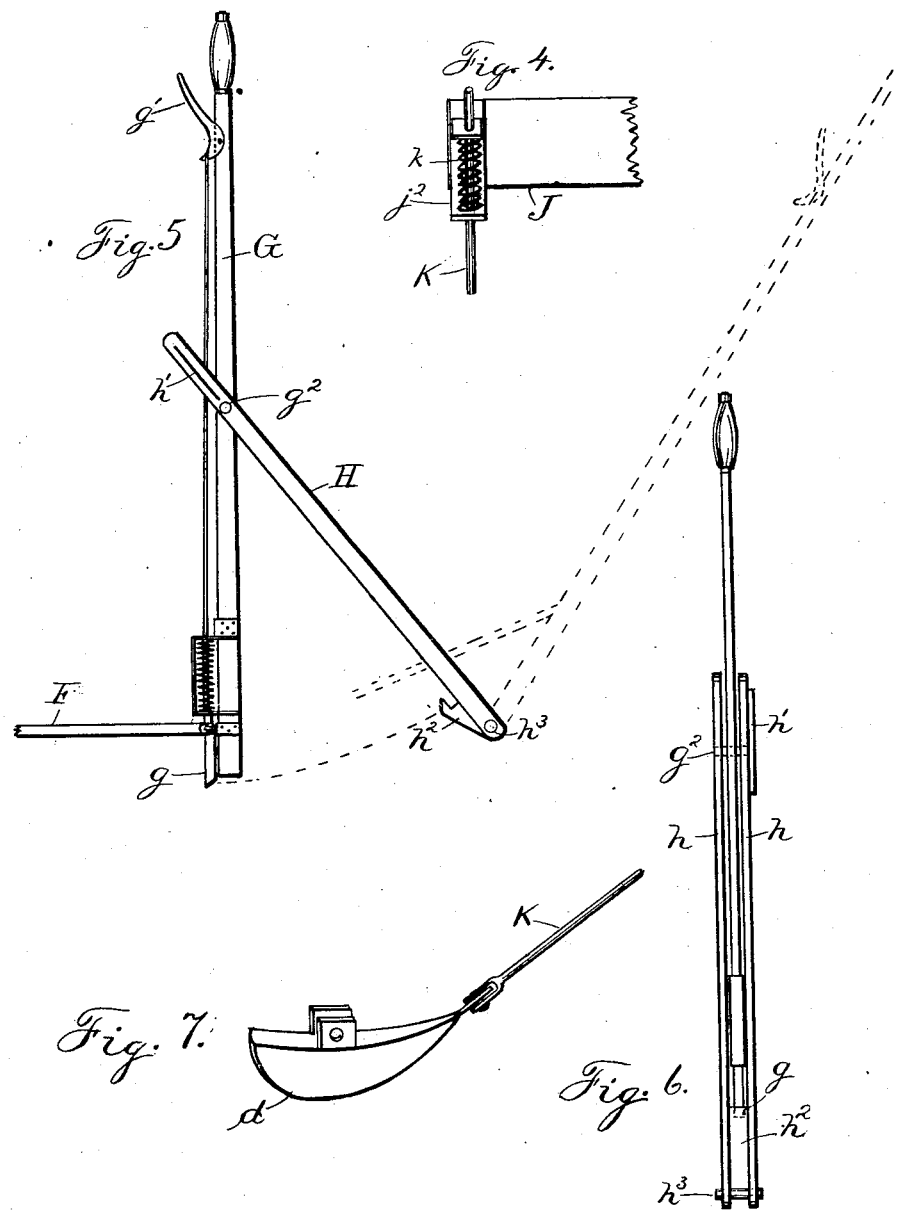

No. 734,115. Patented July 21, 1903.

UNITED STATES PATENT OFFICE.

HARVEY O. BENEDICT, OF SALT LAKE CITY, UTAH.

VEHICLE-BRAKE.

SPECIFICATION forming part of Letters Patent No. 734,115, dated July 21, 1903.

Application filed March 7, 1903. Serial No. 146,747. (No model.)

*To all whom it may concern:*

Be it known that I, HARVEY O. BENEDICT, a citizen of the United States, residing at Salt Lake City, in the county of Salt Lake and State of Utah, have invented certain new and useful Improvements in Vehicle-Brakes; and I do hereby declare the following to be a full, clear, and exact description of the invention, such as will enable others skilled in the art to which it appertains to make and use the same.

My invention relates to that class of vehicle-brakes in which a portion of the weight of the vehicle is taken from the wheels and applied to the ground through adjustable mechanism, whereby the progress of the vehicle is retarded or it is quickly brought to a standstill, at the will of the operator.

The invention is readily applied to vehicles generally; but in this application it is shown in connection with an ordinary four-wheeled wagon. It is preferably attached to the lower side of the rear axle and to the wagon box or bed. When used upon low-built small-wheeled vehicles, it should be secured in part to the front side of the rear axle, and the draw-rod may be connected to the reach or other part of the running-gear, as well as to the box, as shown.

The accompanying drawings illustrate the invention.

Figure 1 presents a general side view of the device in operative position on a wagon from which the wheels on the near side have been removed. Fig. 2 is a rear elevation attached to the axle of the wagon in full operative position with the wheels raised from the ground. Fig. 3 is a side elevation, with its parts separated, of an axle-clip $a$. Fig. 4 is a detail of the bearing for the brace-rod. Fig. 5 is a side elevation of the hand-lever and its connections, dotted lines showing its operative position. Fig. 6 is an edge or rear elevation of the same parts shown in Fig. 5. Fig. 7 is a detail of a brake-shoe. All the views after Fig. 2 are enlarged.

The various parts of the device are referred to by letters, similar letters denoting corresponding parts in the several views.

The letter A indicates the rear axle of a wagon, and $a\ a$ hangers or clips thereon, in which is journaled a rocking crank-shaft B. The cranks of this shaft B are indicated by $b$, which has indirect connection with the hand-lever and pivotally supports the brake-shoe bar D, $b'$, which carries two hangers $c\ c$, in which is journaled the brace-rod C, and $b^2$, which pivotally supports the brake-shoe bar D'. The brace-rod C swings in the hangers $c\ c$ and being terminally pivoted to the brake-shoe bars D D' prevents lateral movement of those bars.

$d\ d'$ are the brake-shoes having vertical ears by which they are pivoted to the lower ends of the bars D D'.

The crank $b$ has a square end $b^3$, adapted to fit a square opening in the arm E. This arm E stands at an angle of about forty-five degrees when in operative position, and its upper end inclines forward. This end is pivoted to the brake-rod F, which extends forward and is pivotally connected to the hand-lever G at the front of the wagon-box. This lever G is pivoted about midway of its length to an arm H, and this arm is pivoted at its lower end to the wagon-box L.

The arm H is composed of two parallel sides $h\ h$, placed apart sufficiently to permit the lever G to move freely between them, and these two parts G and H move with reference to each other like the blades of shears.

I is a guard or comb in which the parts G and H move back and forth, and internal lateral teeth on the comb are adapted to engage a dog $h'$ on the arm H.

At the lower end of the arm H is secured a catch $h^2$ to engage a spring-bolt $g$, operated by a grip-lever $g'$ on the hand-lever G.

J is a bar held by braces $j$ against the under side of the box L, its ends projecting at either side. Ears $j'$ on the bar J are perforated to admit the spring-rods K, whose rear ends are attached to the brake-shoes $d\ d'$.

In Fig. 1 only a single rod is shown; but it is to be understood that these and certain other parts are provided for both sides of the wagon. This rod K may be connected at its upper end with the reach or coupling M of the wagon, if preferred.

As already stated, Figs. 1 and 2 show the device in operative position. When the parts are in the position shown by dotted lines, the lever G and bar H are crossed at their pivotal point $g^2$, the rod F is raised, the arm E is raised and inclined backward, the crank $b$ and bar D are flexed at their joint, and the shoe $d$ is lifted to the position shown.

Supposing the mechanism to be in the position shown in Fig. 5, in order to operate the brake the hand-lever $g$ is drawn back until the spring-bolt $g$ engages the notch $h^2$. This movement closes together the parts G and H, the lever G going in between the two sides $h\ h$ of the bar H. The lever G is then pushed forward, taking the bar H with it, the latter turning on its pivot $h^3$. When sufficient braking force is obtained, the dog $h'$ is made to engage with a tooth of the comb I. This movement draws forward and lowers the rod F, and the arm E straightens the jointed parts $b$ and D and lowers the shoe to the ground, where it is held by the draw-rods K and the brace-rods C. The full force of the brake will bring upon the shoes all of the weight of the rear part of the vehicle, even to lifting the rear wheels from the ground.

The draw-rod K is provided with the spring $k$ to protect the device from too sudden a strain and the jar from extreme roughness of the roadway.

To release the brake, incline the lever slightly toward the box to disengage the dog $h'$. Let the lever back until it rests against the back portion of the comb. Now press the grip-lever $g'$ to disconnect the spring-bolt $g$. Then the lever G is thrown forward, while the bar H remains almost stationary until the lever G and the brake-rod F form nearly a straight line.

Having described the invention, what I claim is—

1. A wagon-brake comprising a hand-lever centrally pivoted to a bar, said bar pivoted at its lower end to the wagon, a catch at the lower end of said bar, a spring-bolt on said lever to engage said catch, a brake-rod pivotally attached to said hand-lever, an arm E pivoted to said brake-rod, a crank on a rocking shaft rigidly connected to said arm E, said rocking shaft being journaled in hangers on the wagon-axle, and bars carrying brake-shoes connected with said rocking shaft, for the purposes stated.

2. A vehicle-brake hand-lever centrally pivoted to a bar, said bar pivoted at its lower end to the vehicle, a catch at the lower part of said bar, a spring-bolt on said lever adapted to engage said catch, and a brake-rod pivotally attached to said hand-lever, and connecting with the brake mechanism, as specified.

3. A wagon-brake comprising a hand-lever having a spring-bolt and pivoted centrally to a bar, said bar having a catch to engage said spring-bolt and being pivoted at its lower end to the wagon, a guide for said lever on the box, a brake-rod pivotally attached to said hand-lever, an arm having a square opening pivotally connected to said brake-rod and to a crank-shaft for the purposes specified.

In testimony whereof I affix my signature in presence of two witnesses.

HARVEY O. BENEDICT.

Witnesses:
SADIE E. PRICE,
JOHN F. CORKER.